United States Patent Office 3,184,430
Patented May 18, 1965

3,184,430
ORGANOTIN POLYMERS
Glenn R. Wilson, Cambridge, Mass., assignor to Monsanto Research Corporation, St. Louis, Mo., a corporation of Delaware
No Drawing. Filed May 14, 1962, Ser. No. 194,642
18 Claims. (Cl. 260—47)

This invention relates to organometallic polymers and more particularly provides new and valuable organotin polymers and the method of preparing the same.

According to the invention, there are provided hitherto unknown polymeric organotin oxides and/or sulfides consisting essentially of the repeating unit:

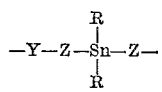

where Y is selected from the class consisting of arylene and alkylenearylenealkylene radicals of from 6 to 12 carbon atoms and such radicals having attached to nuclear carbon thereof an alkyl radical of 1 to 5 carbon atoms, Z is selected from the class consisting of oxygen and sulfur and R is a hydrocarbon benzenoid radical which is free of olefinic and acetylenic unsaturation and contains from 6 to 12 carbon atoms.

Polymers consisting essentially of the above-depicted repeating unit are obtained by the reaction of a diaryltin dihalide, e.g., the chloride, bromide or iodide, with a difunctional aromatic hydroxy compound or thiol or an alkali metal salt thereof, substantially according to the scheme

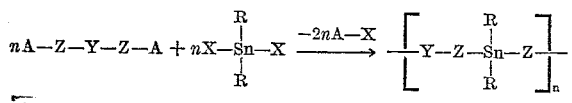

where Y, Z and R are as above defined, A is selected from the class consisting of hydrogen and alkali metal and $n$ denotes the degree of polymerization. Generally, $n$ will be from, say, an average of 10 to 1000.

When Y is phenylene and X is oxygen, the polymers consist of the oxygen ether unit

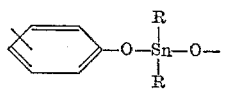

A polymer of the above formula wherein R is aryl has the phenyleneoxydiaryltinoxy unit, and is readily obtained by reaction of a dihydroxybenzene, i.e., hydroquinone, catechol or resorcinol, and a diaryltin dihalide. Presently provided polymers of the above formula having thio linkages instead of oxygen linkages are obtained by using a dithiol instead of the dihydroxybenzene compound. Polymers having both oxygen and sulfur linkages are also provided. These are prepared by employing mercaptophenols, e.g., p-mercaptophenol, instead of the dihydroxy compounds or the dithiols. Although, because of the easy availability of the benzene compounds, the dihydroxyphenols, the benzenedithiols or the mercaptophenols will be the more commonly used starting materials, the arylene group need not be the phenylene group. Instead, it may be the biphenylylene group derived, e.g., by using dihydroxybiphenyl with the diorganotin dihalide; or it may be the naphthylene group, the fluorenylene group, the acenaphthylene group, etc. Also, the bivalent aromatic nucleus may carry one or more alkyl radicals of from 1 to 5 carbon atoms as substituent, e.g., it may be the cyclopentylphenylene, the tetramethylphenylene or the ethylnaphthylene group.

When Y in the repeating unit of the presently provided organotin polymer is alkylenearylenealkylene, the polymers are derived generally from the arenebis(alkanols) or the arenebis(alkanethiols), e.g., o-, m-, or p-xylene-α,α'-diol, durene-α,α'-diol, o-, m-, or p-benzenediethanol, o-, m- or p-benzenebis(ethanethiol), p-xylene-α-ol-α'-thiol, 1,4-naphthalenedimethanol, etc. For example, reaction of p-xylene-α,α'-diol and di-p-tolyltin chloride gives a presently useful polymer having the repeating unit

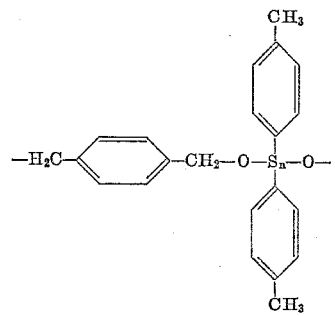

Instead of the free hydroxy compounds or the free thiols, there may be used the alkali metal salts thereof, e.g., the disodium, dipotassium, dilithium or dirubidium salts of hydroquinone, 2,5-dimethylhydroquinone, 4-pentylpyrocatechol, p-benzenebis(propanethiol), 3-butylbenzenedithiol, tetramethylresorcinol, etc.

As hereinbefore disclosed, the diorganotin dihalides which react with the difunctional hydroxy compounds and thiols are hydrocarbon benzenoid tin dihalides which are free of olefinic and acetylenic unsaturation, i.e., they may be aryl, alkaryl, aralkyl, cycloalkylaryl or arylcycloalkyl tin halides, e.g., diphenyltin dibromide, di-o-, m- or p-tolyltin dichloride or difluoride, phenyl-m-tolyltin dibromide or diiodide, bis(4-ethyl or 4-butylphenyl)tin dichloride di-β-naphthyltin dibromide, di-o-, m- or p-biphenylyl dichloride, di-9-fluorenyltin diiodide, bis(β-pentyl-α-naphthyl)tin dibromide, dibenzyltin dibromide, bis-(3-phenylpropyl)tin dichloride, bis(4-cyclopentylphenyl)-tin diiodide, bis(β-naphthylmethyl) dibromide, etc.

Reaction of the hydroxy compound or thiol or alkali metal salt thereof and the diorganotin dihalide takes place readily by mixing together the two reactants at ordinary, decreased or increased temperature and in the presence or absence of a catalyst and allowing the mixture to stand until formation of the polymeric compounds has taken place. Advantageously, reaction is effected by heating the two reactants at a temperature of from say, 50° C. to refluxing in the presence of an inert organic liquid diluent and a basic catalyst. As diluents there may be used liquid hydrocarbons such as hexane, kerosene, benzene or xylene; halogenated hydrocarbons such as carbon tetrachloride or hexachloroethane; ethers such as ethyl ether, dioxane or the methyl ether of diethylene glycol; amides such as dimethylformamide; sulfoxides such as dimethyl sulfoxide; nitro compounds such as 2-nitropropane or nitrobenzene, etc. Useful catalysts are organic or inorganic basic materials such as the alkali and alkaline earth oxides and hydroxides and basic salts thereof, e.g., sodium, potassium, lithium, rubidium, calcium or magnesium hydroxide, carbonate or acetate and organic amines and quaternary nitrogen compounds such as triethanolamine, dibenzyldimethylammonium hydroxide, diethylenetriamine, pyridine, quinoline, etc.

When, instead of the free hydroxy or thiol reactant, there is employed an alkil metal salt thereof, use of catalyst can generally be dispensed with.

The reaction takes place with liberation of hydrogen halide when the free hydroxy compound or thiol is used. In order to facilitate it, vigorous stirring and/or dephlegmation is advantageously employed so that the by-product hydrogen halide is removed from the reaction zone as soon as it is formed. The reaction is also expedited by providing for a hydrogen halide scavenger, i.e., by maintaining in the reaction zone a material which will react with the evolved hydrogen halide and thereby remove it from the reaction zone. The basic materials noted above in discussing catalytic materials will also serve the purpose of hydrogen halide scavengers. As will be well apparent to those skilled in the art, for best results the hydrogen halide scavenger should be present in a quantity which is equimolar to the calculated quantity of hydrogen halide. However, use of stirring and/or dephlegmation will frequently result in need for much less scavenger than would have been needed without such physical manipulation.

The progress of the reaction can be gauged by change in viscosity of the reaction mixture, evolution of hydrogen halide and/or consumption of base and formation of salt, etc. When diluent and catalyst have been employed these are removed from the reaction mixture by isolating procedures generally known to those skilled in the art, e.g., solvent extraction, fractional distillation, crystallization, etc.

Advantageously the aromatic diorganotin dihalide and the hydroxy or thio compound are used in substantially equimolar proportions, i.e., one mole of halide per mole of hydroxy compound or thiol or salt thereof. However, an excess of either reactant may be employed, since unreacted material is readily recovered from the final product.

The presently provided aromatic organotin polymers are stable, well-defined compounds which are generally highly viscous fluids or high-melting, waxy or crystalline solids. They are useful for a variety of industrial and agricultural purposes. The high viscosity, polymeric organotin compounds find use as functional fluids, being high-boiling and very thermally stable. Both the viscous compounds and the solids are useful as stabilizing agents for synthetic polymers, particularly for the polyvinyl halides, to which they also can confer plasticizing effect. The presently useful polymers also serve as sizing materials and/or anti-static treating agents for fibrous products and as the effective ingredients of biological toxicant compositions, e.g., fungicides and insecticides. As disclosed in the copending application of G. R. Wilson, J. R. Stemniski and K. L. McHugh, Serial No. 194,650, filed of even date, they are useful as antioxidant additives for polyphenyl ether fluid lubricants.

The invention is further illustrated by, but not limited to, the following examples.

*Example 1*

Diphenyltin dichloride (25.4 g., 0.08 mole) and 0.1 g. of phenol was added to the dipotassium salt of hydroquinone prepared from 8.1 g. (0.08 mole) of hydroquinone and 9.7 g. of 85% potassium hydroxide. Toluene was added as diluent and the whole was refluxed for 6 hours and filtered hot. From the cool filtrate there separated a white polymer, M.P. 172–174° C. having the repeating unit

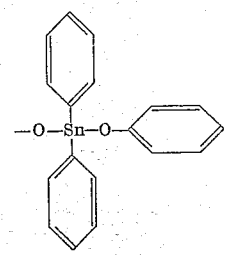

An additional quantity of the polymer was obtained by extracting the solid residue with toluene.

*Example 2*

To a benzene solution of 34.4 g. (0.1 mole) of diphenyltin dichloride and 17 g. (0.1 mole) of p-xylene-$a,a'$-dithiol there was added 0.2 mole of sodium carbonate. The mixture was refluxed for 2 hours and filtered hot. Upon addition of petroleum ether to the filtrate, stratification occurred. The upper layer of solvent was decanted, and the residue was washed three times with ether and freed of solvent by evacuation in a vacuum desiccator to give a substantially pure viscous polymeric product consisting essentially of the repeating unit.

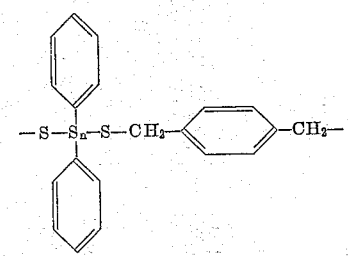

*Example 3*

This example describes evaluation of the polymer of Example 2 as an antioxidant for a mixture of polyphenyl ethers consisting by weight of 65% of m-bis(m-phenoxyphenoxy)benzene
30% of m-[(m-phenoxyphenoxy)(p-phenoxyphenoxy)]benzene
5% of m-bis(p-phenoxyphenoxy)benzene Testing was conducted as follows: Duplicate test samples containing 1.0 g. of the polymer per 100 g. of said mixture of ethers were prepared. Duplicate test samples containing only the mixture of ethers and no additive were set up as controls. The viscosity of all the test samples was determined at 100° F. The samples were heated to 600° F. and air was bubbled into the heated samples for 24 hours at a rate of 1 liter per hour. At the end of this time, there was observed a significant decrease in viscosity of the test samples which contained the polymer as compared to the controls.

What I claim is:

1. An organotin polymer consisting essentially of the repeating unit

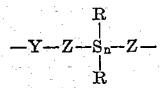

wherein Y is selected from the class consisting of arylene and alkylenearylenealkylene radicals of from 6 to 12 carbon atoms and such radicals having attached to nuclear carbon thereof an alkyl radical of 1 to 5 carbon atoms, Z is selected from the class consisting of oxygen and sulfur and R is a hydrocarbon benzenoid radical which contains from 6 to 12 carbon atoms and is free of olefinic and acetylenic unsaturation, said polymer having an average of from 10 to 1000 of the said repeating units.

2. The polymer defined in claim 1 further limited in that Y is arylene.

3. The polymer defined in claim 1 further limited in that Y is alkylenearylenealkylene.

4. The polymer defined in claim 1 further limited in that Z is oxygen.

5. The polymer defined in claim 1 further limited in the Z is sulfur.

6. An organotin polymer consisting essentially of the repeating unit

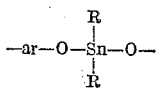

wherein ar is an arylene radical of from 6 to 12 carbon atoms and R is a hydrocarbon benzenoid radical which contains from 6 to 12 carbon atoms and is free of olefinic and acetylenic unsaturation, said polymer having an average of from 10 to 1000 of the said repeating units.

7. An organotin polymer consisting essentially of the repeating unit

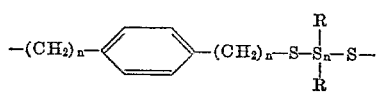

in which $n$ is 1 to 3 and R is a hydrocarbon benzenoid radical which contains from 6 to 12 carbon atoms and is free of olefinic and acetylenic unsaturation, said polymer having an average of from 10 to 1000 of the said repeating units.

8. An organotin polymer consisting essentially of the repeating unit

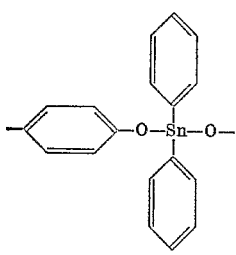

said polymer having an average of from 10 to 1000 of the said repeating unit.

9. An organotin polymer consisting essentially of the repeating unit

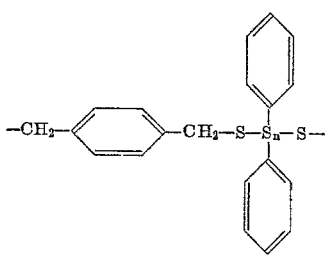

said polymer having an average of from 10 to 1000 of the said repeating unit.

10. The method which comprises heating at 50° C. to refluxing in an inert organic liquid diluent a diorganotin dihalide of the formula $R_2SnX_2$ wherein R is a hydrocarbon benzenoid radical which is free of olefinic and acetylenic unsaturation and X is halogen, with a difunctional compound of the formula AZ—Y—ZA in which A is selected from the class consisting of hydrogen and alkali metal, Z is selected from the class consisting of oxygen and sulfur, and Y is selected from the class consisting of arylene and alkylenearylenealkylene radicals of from 6 to 12 carbon atoms and such radicals having attached to nuclear carbon thereof an alkyl radical of from 1 to 5 carbon atoms, and recovering from the resulting reaction product a polymer consisting essentially of the repeating unit

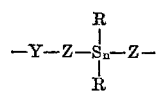

said polymer having an average of from 10 to 1000 of the said repeating units.

11. The method defined in claim 10, further limited in that Y is arylene.

12. The method defined in claim 10, further limited in that Y is alkylenearylenealkylene.

13. The method defined in claim 10, further limited in that Z is oxygen.

14. The method defined in claim 10, further limited in the Z is sulfur.

15. The method which comprises refluxing in the presence of an inert organic liquid diluent, a diorganotin dihalide of the formula $R_2SnX_2$ in which R is a hydrocarbon benzenoid radical which contains from 6 to 12 carbon atoms and is free of olefinic and acetylenic unsaturation and X is halogen, with the alkali metal salt of an arylenediol of from 6 to 12 carbon atoms and recovering from the resulting reaction product a polymer consisting essentially of the repeating unit

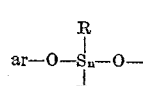

wherein ar is an arylene radical of from 6 to 12 carbon atoms and R is as defined above, said polymer having an average of from 10 to 1000 of the said repeating units.

16. The method which comprises refluxing in the presence of an inert organic liquid diluent and a basic catalyst a diorganotin dihalide of the formula $R_2SnX_2$ in which R is a hydrocarbon benzenoid radical which contains from 6 to 12 carbon atoms and is free of olefinic and acetylenic unsaturation and X is halogen, with a dithiol of the formula

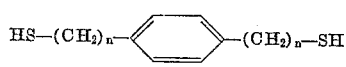

wherein $n$ is 1 to 3, and recovering from the resulting reaction product a polymer consisting essentially of the repeating unit

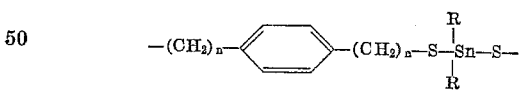

in which $n$ and R are as above defined.

17. The method which comprises refluxing diphenyltin dichloride with the dipotassium salt of hydroquinone in the presence of an inert organic liquid diluent and recovering from the resulting reaction product a polymer consisting essentially of the repeating unit

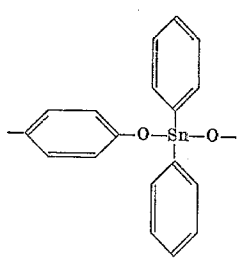

said polymer having an average of from 10 to 1000 of the said repeating units.

18. The method which comprises refluxing diphenyltin dichloride with p-xylene-α,α'-dithiol in the presence of an inert organic liquid diluent and recovering from the resulting reaction product a polymer consisting essentially of the repeating unit

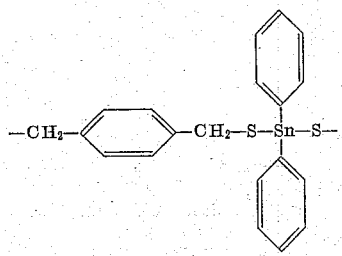

said polymer having an average of from 10 to 1000 of the said repeating units.

References Cited by the Examiner
UNITED STATES PATENTS 2,626,953  1/53  Mack et al. _____ 260—2
2,801,258  7/57  Johnson _____ 260—429.7

OTHER REFERENCES

Kuivila, et al.: J. Organic Chemistry, vol. 26, pages 1430–1433, May 1961.

WILLIAM H. SHORT, *Primary Examiner*.